Jan. 12, 1971  J. E. DÍAZ-COMPAIN  3,554,799
APPARATUS FOR DIFFUSION AND LIXIVIATION OF
SUGAR CANE, BEET-SUGAR OR SWEET SORGHUM

Filed May 15, 1968  2 Sheets-Sheet 1

INVENTOR.
JERÓNIMO E. DÍAZ-COMPAIN

BY
McGlew & Toren
ATTORNEYS

3,554,799
APPARATUS FOR DIFFUSION AND LIXIVIATION OF SUGAR CANE, BEET-SUGAR OR SWEET SORGHUM

Jerónimo E. Díaz-Compain, P.O. Box 370, Cathedral Station, New York, N.Y. 10025
Filed May 15, 1968, Ser. No. 729,187
Int. Cl. C13d 1/12, 1/10; B01d 11/02
U.S. Cl. 127—6                                                9 Claims

ABSTRACT OF THE DISCLOSURE

An apparatus for diffusing a crop, such as sugar cane, beet-sugar, sorghum and the like, comprising means defining a vertically elongated treatment chamber having a plurality of annular treatment passes or corona paths arranged one above the other. The product to be treated, such as sugar cane chips, is directed downwardly into the top annular treatment chamber at one circumferential location and they are advanced around the complete annular path of the chamber at that level by means of a rotating slat member or pusher. During the course of travel over the treatment path, a treatment liquid is directed downwardly over the product as the product is advanced over alternately arranged plate screens and steam heated plates of the floor of such treatment chamber. The treatment liquid passes through the material and is collected below the plate screens in tanks. The product is delivered after treatment from one layer downwardly through a chute to one or more additional layers in which it is moved through a similar path.

SUMMARY OF THE INVENTION

This invention relates in general to a construction of treatment apparatus, particularly for products such as sugar cane, sugar beet or sweet sorghum and in particular to a new and useful apparatus for the diffusion and lixiviation of such products which includes means defining a plurality of annular treatment chambers at distinct levels with means for moving a material to be treated over the surfaces of each chamber during which time liquid is passed therethrough; and for thereafter delivering the product after treatment downwardly to the next adjacent treatment chamber in succession.

Devices for diffusing products such as sugar cane chips, beet-sugar chips, and sorghum chips, are known which include means for conveying the chips through a path while they are treated with a liquid preferably with additional heating means in order to remove desirable constituents from these products. One of the disadvantages of such structures is that they require a great amount of space in the treatment plant and they are relatively expensive because of the necessary piping and conveyor elements which are required.

In accordance with the present invention there is provided a very simple and inexpensive compact treatment device which comprises an elongated tower of annular interior configuration which is sub-divided into a plurality of vertically spaced annular treatment chambers. Each annular treatment chamber includes a floor having a bar screen which permits passage of the treatment liquid therethrough but which also provides for the carrying of the treated substance around through the annular path of the chamber to a downward delivery chute and to the next adjacent treatment chamber. The apparatus advantageously includes a central rotating shaft which carries a plurality of radially extending slat members or pushers which move behind the material to be treated and advance it around each annular treatment chamber. Each treatment chamber level is provided with its own radial pusher arm for advancing the material through an annular treatment path to a location at which it comes into alignment with the down chute for delivery to the next adjacent chamber.

The treatment is carried out by directing a liquid through the material and withdrawing the liquid through the bar screen at the bottom of the material and into tanks. The liquid is advantageously circulated backwardly in a reverse direction to the flow of the material. In the preferred arrangement, alternate segmental shaped portions of the floor of each treatment chamber are heated, such as by steam, in order to increase the diffusion action on the product to be treated. Devices such as kickers are employed at the end of each compartment in order to break up the treated material prior to its delivery downwardly to the next adjacent treatment chamber.

Accordingly it is an object of the invention to provide an apparatus for treating a product such as sugar cane, beet-sugar, sweet sorghum and the like, which comprises means defining a plurality of annular paths arranged at vertically spaced levels and means for advancing the product to be treated around each annular path for delivery downwardly to the next adjacent path while the treatment liquid is passed through the material as it is advanced.

A further object of the invention is to provide a treatment device which includes spaced inner and outer cylindrical walls which define an annular treatment chamber which is subdivided vertically and wherein each chamber includes a screen floor over which the treatment material is moved and each includes means for circulating a liquid downwardly through the material and through the floor for collection in tanks below the floor, each chamber having an inlet adjacent one portion of the periphery and a downward discharge at the opposite end of the annular path communicating with the next lower treatment chamber, and wherein the means for advancing the material through the treatment chamber comprises a rotatable shaft arranged centrally within the inner annular wall of the treatment chambers and carrying slat members which extend radially into each chamber and which carry sealing plates which move adjacent the inner wall of the treatment chamber in sealing engagement therewith.

A further object of the invention is to provide a treatment device for a product such as sugar cane, sugar-beet and sweet sorghum which is simple in design, rugged in construction and economical to manufacture.

The various features of novelty which characterize the invention are pointed out with particularity in the claims annexed to and forming a part of this specification. For a better understanding of the invention, its operating advantages and specific objects attained by its use, reference should be had to the accompanying drawings and descriptive matter in which there is illustrated and described a preferred embodiment of the invention.

GENERAL DESCRIPTION OF THE PREFERRED EMBODIMENT

Figure 1:
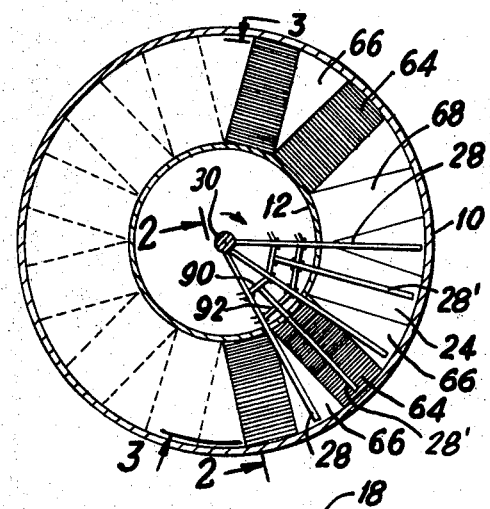
FIG. 1 is a horizontal sectional view through a treatment apparatus constructed in accordance with the invention.

Referring to the drawings in particular, the invention embodied therein comprises a treatment apparatus for the diffusion of sugar cane chips, beet-sugar chips, sorghum and the like, which comprises an outer cylindrical wall 10 and an inner cylindrical wall 12 which together define a plurality of vertically spaced annular treatment chambers or coronas, in this instance two treatment chambers 14 and 16.

In accordance with the invention, material to be treated is moved along by a feed conveyor 18 which is preferably of a construction to provide a uniform distribution of the material across the inlet of a feed hopper 20 as indicated by arrows 22. The hopper 20 is located to deliver the material to be treated downwardly over a sector or incoming space 24 at the treatment chamber 14. The material in the form of chips is permitted to rise to a level such as the level 26 as it is continuously moved by the rotation of the plurality of radial strut members or pushers 28. The strut members 28 are secured to a central vertical shaft 30 for rotation therewith and they are located at a height corresponding to the level of the particular chamber through which they will move. The vertical shaft 30 is supported in a framework generally designated 32 which includes horizontal members 34 and diagonal members 36 which are braced with the inner and outer walls 10 and 12 and supported on upright columns 38 and 40. The shaft is rotated in spaced vertical bearings 42 and it is supported on a ball journal 44 for easy rotation. The rotation of the shaft 30 is caused by driving motor 46 driving through a belt 48 and pulley 50 and associated gearing generally designated 22.

A feature of the invention is the provision of sealing plates 54 which are carried on each of the struts 28 and which ride in close engagement with the interior wall 12 and provide a sealing therewith.

In accordance with another feature of the invention, the material to be treated is contacted by liquid which is directed as an overflow through one side of the channel member 60 and collected in tanks 62 which are located below annuarly spaced sets of screens 64 arranged alternately around the treatment path with sector-shaped area 66 which are heated such as by steam heating pipe connections (not shown). The material which enters in the chamber 14 at the sector 24 is moved completely around the annular path over the screens 64 and over the heating plate 66, to a discharge chute 68 located at the end of the annular treatment path.

At the end of the first treatment path, the material falls downwardly through the chute 68 (FIGS. 1 and 3) and it is broken up by a kicker member or paddle wheel 70. The thus partially treated material falls on the next annular treatment chamber 16 and is moved in a similar manner through an annular path. In the embodiment illustrated, only two vertically spaced treatment chambers 14 and 16 are indicated but a number more than this may be provided if desired.

Figure 2:
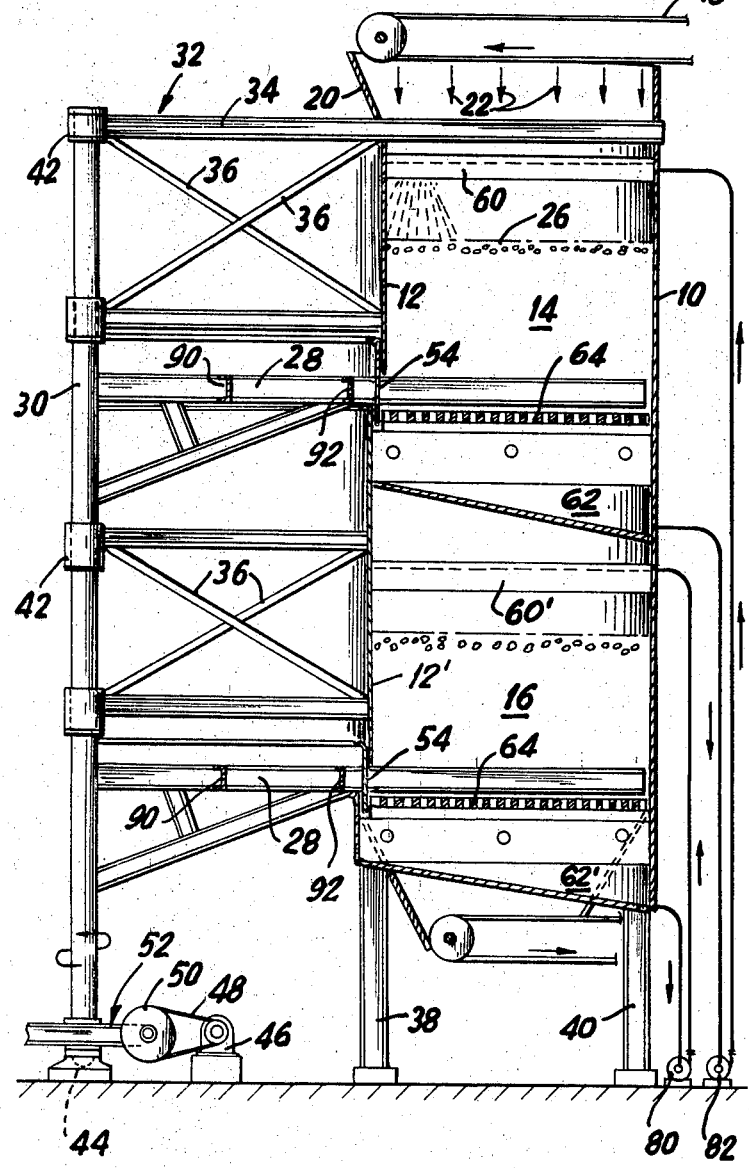
FIG. 2 is an enlarged partial vertical section taken on the line 2–2 of FIG. 1.
Figure 3:
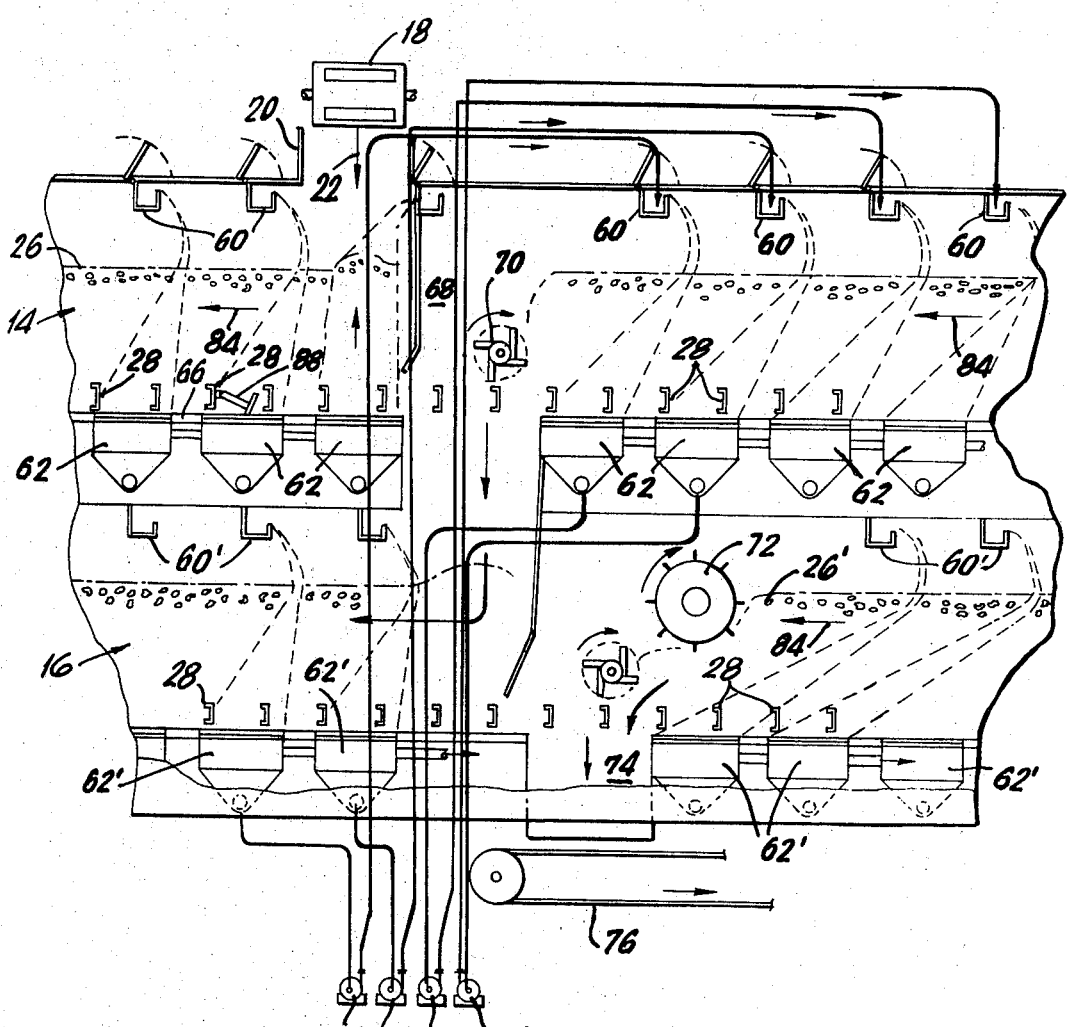
FIG. 3 is an enlarged partial development of the treatment device taken along the line 3–3 of FIG. 1.

At the end of the second treatment chamber 16 there is arranged a drying wheel generally designated 72 which provides a suitable drying and treatment action upon the bagasse material (for sugar chips) which arrives at the end of the treatment cycle as indicated by 26' in FIG. 3. The treated material then falls downwardly through a chute 74 and onto a conveyor 76 for removal of the bagasse to a drying mill (not shown). The treatment liquid which comprises a macerational juice is circulated from the lowermost tank 62' by a pump 80 back through a distribution canal 60' for recirculation of the material being passed through compartment 16. In a similar manner, the liquid from the tank 62 is circulated by a pump 82 back to the distribution canal 60 for circulation over the material passed through the treatment chamber 14 (FIG. 2.) As indicated in FIG. 3, pumps 80' are arranged to take suction at the lower tank 62' and deliver the liquid to upper distribution channels 60. Pumps 82' are arranged to take suction from the upper tank 62 of chamber 14 and deliver the treatment liquid back to the distribution channel 60 of the upper chamber 14. The circulation is in a reverse direction of the movement of the materials, as indicated by the arrows 84.

The inventive construction provides a means for diffusing the products mentioned above in a simple and inexpensive manner. The only moving parts required are the rotating slats 28 along with their associated sealing plates 54. The slats 28 are braced circumferentially by members 90 and 92 which are secured intermediate their length to shorter slats 28' (FIG. 1).

The arrangement is such that the movement may be accomplished in easy manner with a minimum of friction and operating power. By using annular treatment chambers, the material being treated is maintained homogeneous throughout the annular path. In addition, the temperature and conditions of treatment of the material may be maintained uniform from each treatment stage to the next.

As a feature of the construction, the strut members 28 advantageously support individual scrapers 88 (FIG. 3) which operate to scrape the material off the surface of the screen floor 64 and also off the steam heated sectors 66. The apparatus provides a simple means for the control and distribution of the treatment liquid and for the removal of material from one stage to the next and for removal from the treatment apparatus.

While a specific embodiment of the invention has been shown and described in detail to illustrate the application of the inventive principles, it will be understood that the invention may be embodied otherwise without departing from such principles.

What is claimed is:

1. An apparatus for treating a product such as sugar cane, sugar-beet, sweet sorghum and the like, comprising wall means defining at least one continuous undivided annular treatment chamber with a material inlet adjacent one end and a material discharge chute adjacent the opposite end, screen means defining at least a portion of the floor of said treatment chamber of a size to permit the withdrawal of treatment liquid therethrough, tank collecting means below said screen means for collecting the treatment liquid delivered through said screen means, means for directing a treatment liquid downwardly in said annular chamber over material positioned therein and into said tank means, at least one radially extending pusher extending into said chamber, means mounting said pusher for rotational movement centrally of said chamber to cause the portion thereof in said chamber to advance material from said inlet around said treatment chamber to said discharge chute, and sealing plate means carried by said pusher and sealing said chamber around the entrance of said pusher into said chamber.

2. An apparatus according to claim 1, wherein said wall means define a plurality of vertically spaced treatment chambers, the uppermost one of said chambers being in communication with said inlet, the next adjacent one of said chambers being in communication with said discharge chute for receiving material treated by the next superjacent chamber and having a discharge chute communicating downwardly with the next adjacent treatment chamber.

3. An apparatus according to claim 1, including means for circulating the treatment liquid from said tank collecting means back to said means for directing treatment liquid downwardly in a direction counter to the direction of movement of said material through said treatment chamber.

4. An apparatus according to claim 1, wherein said pusher comprises a plurality of angularly spaced radially extending pusher struts, a vertical shaft, said pusher struts being secured to said shaft for rotation therewith, said wall means comprising a frame supporting said vertical shaft and an inner wall and an outer wall at spaced locations from each other defining an annular treatment chamber.

5. An apparatus according to claim 4, wherein said means for directing a treatment liquid downwardly comprises a distribution channel extending across said treatment chamber at a plurality of spaced locations around said annular treatment path.

6. An apparatus according to claim 1, including a plurality of vertically spaced annular treatment chambers defined one above the other and a radially extending arm for each of said chambers being connected to said vertical shaft at spaced vertical locations in positions to extend into the associated treatment chambers directly over said screen means.

7. An apparatus according to claim 6, wherein each of said arms carries sealing plate means comprising a sealing plate of substantially annular configuration bearing adjacent said wall means in sealing engagement therewith.

8. An apparatus according to claim 7, wherein said wall means comprises an outer cylindrical wall and an inner cylindrical wall spaced inwardly from said outer wall, said vertical shaft being located centrally within said inner and outer cylindrical walls.

9. An apparatus according to claim 8, including a discharge chute connected to the lowermost one of said annular chambers, and conveyor means adjacent said discharge chute for conveying the treated material to a further station.

References Cited

UNITED STATES PATENTS

| | | | |
|---|---|---|---|
| 1,089,495 | 3/1914 | Raabe | 127—5 |
| 2,840,459 | 6/1958 | Karnofsky | 23—270X |
| 3,062,626 | 11/1962 | Beck | 23—269 |
| 3,131,202 | 4/1964 | Depmer | 3—272.5 |

JOSEPH SCOVRONEK, Primary Examiner

D. G. CONLIN, Assistant Examiner

U.S. Cl. X.R.

23—269, 270; 127—5, 45